United States Patent
Kim et al.

(10) Patent No.: US 10,129,536 B2
(45) Date of Patent: Nov. 13, 2018

(54) MULTI-VIEW 3D DISPLAY APPARATUS

(71) Applicant: Korea Institute of Science and Technology, Seoul (KR)

(72) Inventors: Sung Kyu Kim, Seoul (KR); Ki Hyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 263 days.

(21) Appl. No.: 15/343,523

(22) Filed: Nov. 4, 2016

(65) Prior Publication Data

US 2017/0374358 A1 Dec. 28, 2017

(30) Foreign Application Priority Data

Jun. 22, 2016 (KR) .................. 10-2016-0077933

(51) Int. Cl.
| | |
|---|---|
| *H04N 9/47* | (2006.01) |
| *H04N 13/349* | (2018.01) |
| *H04N 13/31* | (2018.01) |
| *G02B 27/22* | (2018.01) |
| *H04N 13/351* | (2018.01) |

(52) U.S. Cl.
CPC .......... *H04N 13/349* (2018.05); *G02B 27/22* (2013.01); *H04N 13/31* (2018.05); *H04N 13/351* (2018.05)

(58) Field of Classification Search
CPC .... H04N 13/349; H04N 13/351; H04N 13/31; G02B 27/22

USPC .......................................................... 348/54
See application file for complete search history.

(56) References Cited

U.S. PATENT DOCUMENTS

2006/0262185 A1* 11/2006 Cha ................. H04N 5/72
                                                      348/51
2015/0029317 A1*  1/2015 Kim ................ H04N 13/376
                                                      348/59

FOREIGN PATENT DOCUMENTS

KR    10-2012-0034581 A    4/2012

OTHER PUBLICATIONS

Yoon, K. et al., "Diffraction effects incorporated design of a parallax barrier for a high-density multi-view autosteroscopic 3D display," Optics express, vol. 24 No. 4, 2016 (pp. 4057-4075).

* cited by examiner

Primary Examiner — Allen C Wong
(74) Attorney, Agent, or Firm — NSIP Law (57) ABSTRACT

The present invention relates to a multi-view three-dimensional (3D) display apparatus including a display panel in which pixels (or subpixels) outputting an image are arranged and a parallax barrier disposed on a front surface of the display panel and including a plurality of apertures, wherein the apertures of the parallax barrier are set according to a Fresnel number.

7 Claims, 11 Drawing Sheets
(11 of 11 Drawing Sheet(s) Filed in Color)

MULTI-VIEW 3D DISPLAY APPARATUS

CROSS-REFERENCE TO RELATED APPLICATION

This application claims priority to and the benefit of Korean Patent Application No. 2016-0077933, filed on Jun. 22, 2016, the disclosure of which is incorporated herein by reference in its entirety.

BACKGROUND

1. Field of the Invention

The present invention relates to a multi-view three-dimensional (3D) display apparatus, and more particularly, to a multi-view 3D display apparatus which optimizes viewing zone characteristics by taking into account diffraction effects at a parallax barrier.

2. Discussion of Related Art

A 3D image realization technique which has been suggested as an alternative to address a problem of stereoscopic 3D display is generally referred to autostereoscopic 3D display. Among autostereoscopic 3D display apparatus, a multi-view 3D display apparatus, which provides an observer in front of the display apparatus with a 3D image based on information about binocular disparity and motion parallax by arranging a finite number of 3D view images in a space using a time-multiplexing or space-multiplexing technique, is the most widely known.

Such a multi-view autostereoscopic 3D display apparatus may use a parallax barrier (PB), a lenticular lens or a line light source for parallax separation. Among these, multi-view 3D display using a PB includes dividing pixels on a display panel to arrange 3D disparity image information and using the PB such that the arranged 3D disparity image information is separated and distributed in a space.

A viewpoint distance is generally designed to be greater than a pupil width of an observer in a multi-view type 3D display apparatus, which is the most common type of currently commercialized 3D product. However, multi-view 3D display can cause visual fatigue to human factors of an observer since a focused position of one eye and a convergence position of both eyes of the observer are different among physiological 3D depth cues.

Research has shown that this visual fatigue stemming from the mismatch between the focused position of one eye and the convergence position of both eyes can be mitigated when a viewpoint distance is reduced to be smaller than the pupil width of the observer, and the focused position of one eye and the convergence position of both eyes become the same. A display apparatus using this new concept is referred to as a super-multi-view 3D display apparatus. In particular, a multi-view 3D display apparatus with a viewpoint distance corresponding to the pupil width of the observer or less may be designated as a high-density multi-view 3D display (HD-MV3D) apparatus. Two important characteristics among the characteristics of the above defined HD-MV3D display apparatus are continuous motion parallax and crosstalk between adjacent viewpoints.

Figure 1:
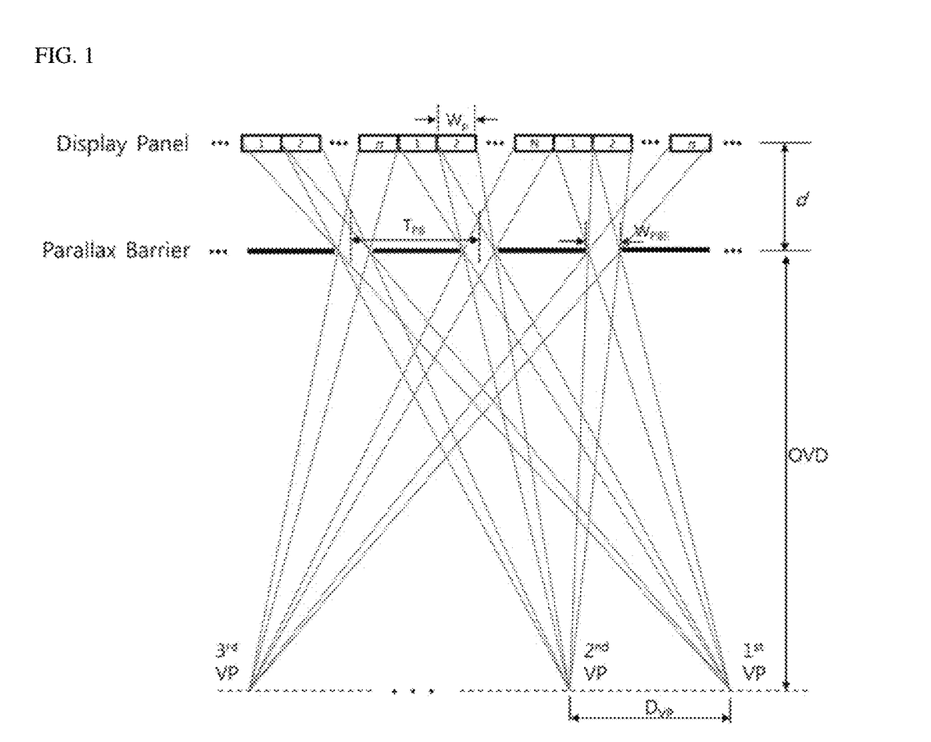
FIG. 1 is a conceptual diagram illustrating a design of a conventional parallax-barrier-based (PB-based) multi-view 3D display apparatus.

FIG. 1 is a conceptual diagram illustrating a design of a conventional PB-based multi-view 3D display apparatus. Referring to FIG. 1, the multi-view 3D display apparatus provides an observer with a common viewing zone by geometric relations using the PB. When a pixel width (or subpixel width) of a display panel ($W_P$), an optimum viewing distance (OVD) which is a 3D design parameter, a viewpoint distance ($D_{VP}$), and a number of viewpoints (n) are determined, an aperture forming period of a PB ($T_{PB}$), a PB aperture size ($W_{PBS}$), and a distance between the display panel and the PB (d) may be determined as in the following Expressions 1, 2, and 3.

$$W_{PBS} = \frac{D_{VP} \times W_P}{D_{VP} + W_P} \quad \text{[Expression 1]}$$

$$T_{PB} = \frac{n \times D_{VP} \times W_P}{D_{VP} + W_P} \quad \text{[Expression 2]}$$

$$d = \frac{OVD \times W_P}{D_{VP}} \quad \text{[Expression 3]}$$

Figure 2:
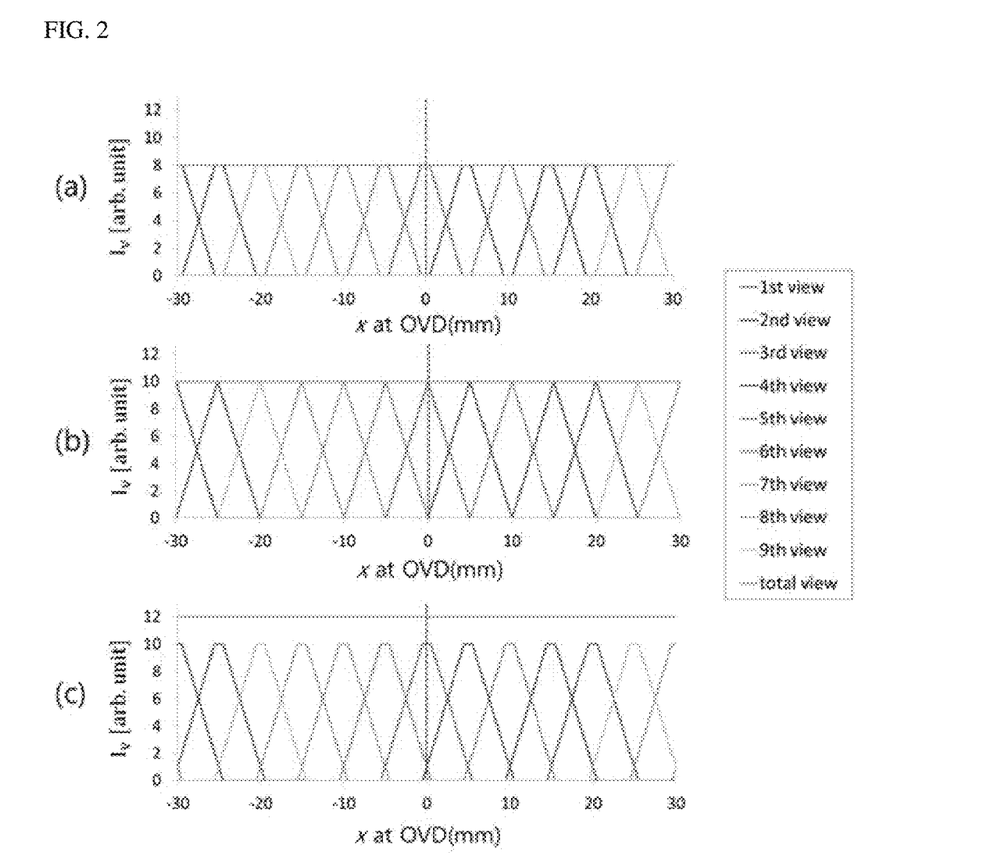
FIG. 2 is a view illustrating viewing zone characteristics according to an aperture ratio at a conventional vertical PB structure.

FIG. 2 is an example illustrating computer simulation results with respect to viewing zone characteristics at a vertical PB structure satisfying Expressions 1 to 3 when $D_{VP}$=5 mm and OVD=600 mm. Here, (a), (b), and (c) in FIG. 2 are the results under the conditions β=0.8, β=1, and β=1.2, respectively. That is, the PB aperture size ($W_{PBS}$) may be adjusted in order to improve the viewing zone characteristics by adjusting brightness of a viewing zone and crosstalk formed at a 3D display apparatus designed as shown in FIG. 1. Further, β which is a parameter for evaluating the PB aperture size ($W_{PBS}$) characteristics may be defined as in the following Expression 4.

$$\beta = \frac{W_{PB}}{W_{PBS}} \cong \frac{W_{PB}}{W_p} \quad \text{[Expression 4]}$$

β defined in Expression 4 represents a ratio between a general PB aperture defined in Expression 1 and a PB aperture to be used, and the condition β=1 is used in a general geometric design. However, as shown in (a) of FIG. 2, when the PB aperture becomes 0.8 times the general design value in Expression 1, there is a disadvantage in that a maximum brightness of a viewing zone decreases since light coming all regions of pixels in which view images are arranged is partially blocked by the PB even at the center of the viewing zone. However, even during horizontal movement within a predetermined range from the center of the viewing zone at an observing position, there is a region in which the brightness of the viewing zone is uniformly maintained, thus showing tendencies of increasing the uniformity of the viewing zone. Further, since a region that rays coming from the pixels in which adjacent viewpoints are arranged do not reach increases in proportion to an increase in the uniformity of the viewing zone, crosstalk becomes zero near the center of the viewing zone (i.e., a horizontal range in which a uniform viewing zone is formed).

On the other hand, as shown in (c) of FIG. 2, when the PB aperture becomes 1.2 times the general design value in Expression 1, the maximum brightness of the corresponding viewing zone does not change, but a tendency of the crosstalk at the center of the viewing zone to increase is shown because the adjacent view images enter the center of the corresponding viewing zone. Even in this case, a region in which the brightness of the viewing zone is uniform during horizontal movement within a predetermined range from the center of the viewing zone is generated because all rays from the whole pixel region in which one view image is arranged may arrive to the extent that the PB aperture is increased even when it deviates from the center of the viewing zone in the horizontal direction.

Figure 3:
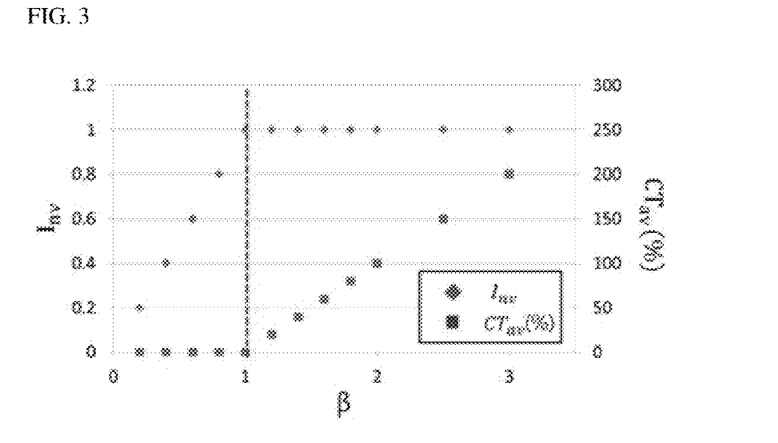
FIG. 3 is a view illustrating brightness and crosstalk of a viewing zone at a conventional vertical PB structure using a PB aperture ratio as parameters.

FIG. 3 is a computer simulation result of the multi-view 3D display apparatus with the same design as in FIG. 2 using the PB aperture ratio β as a parameter. In FIG. 3, the conditions are $W_P$=30 μm and $D_{VP}$=5 mm, $I_{nv}$ denotes brightness at the center of a viewing zone in which the maximum brightness of the viewing zone is standardized as 1, and $CT_{av}$ (%) denotes point crosstalk at the center of one viewing zone.

As shown in FIG. 3, at the PB aperture (β=1) in the general design, the brightness ($I_{nv}$) of the viewing zone becomes maximum and the crosstalk ($CT_{av}$) becomes zero. However, as β decreases below 1, the brightness ($I_{nv}$) decreases while the crosstalk ($CT_{av}$) remains at zero. This may be considered as worsening of the viewing zone characteristics of the general 3D display condition in terms of brightness, but as shown in FIG. 2A, this means that a flat region of the viewing zone is increased and an ideal viewing zone in which crosstalk ($CT_{av}$) becomes zero is widened. Therefore, the viewing zone characteristics may be improved in terms of crosstalk ($CT_{av}$) within a predetermined range while a loss is accepted in brightness of the viewing zone. On the other hand, when β increases above 1, a loss may occur in terms of crosstalk ($CT_{av}$). However, as shown in (c) of FIG. 2, a region in which the brightness of the viewing zone is uniform is increased and the brightness of the whole viewing zones can be increased, thereby improving the viewing zone characteristics in terms of the brightness and uniformity of the viewing zone. Therefore, from the characteristics in accordance with β of the 3D display, the width of the PB aperture may vary (i.e., β may be a parameter), and the viewing zone characteristics of the geometric 3D display may be optimized to fit a purpose of a 3D application to be used.

Figure 4:
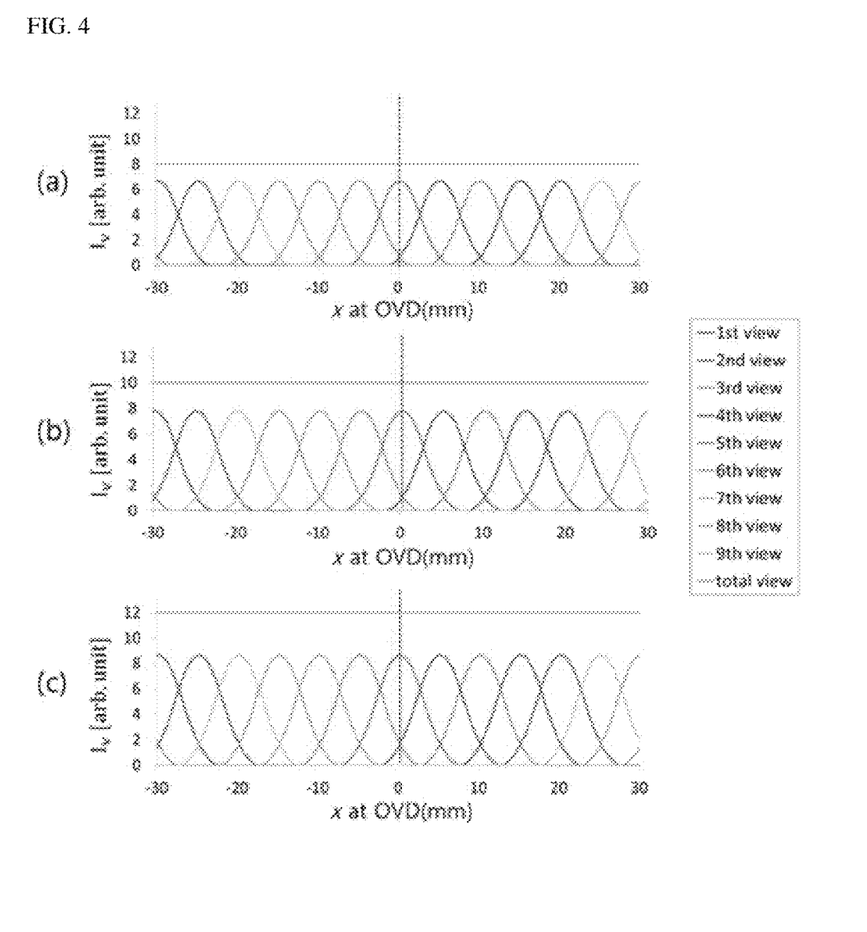
FIG. 4 is a view illustrating viewing zone characteristics according to an aperture ratio at a conventional tilted PB structure.

Hereinafter, a case in which the PB aperture is tilted at a predetermined angle from a vertical axis of a display will be described. FIG. 4 illustrates a case in which a PB aperture is tilted at arcTan(⅓) from a vertical axis in comparison of the vertical PBs in FIGS. 2 and 3. Here, (a), (b), and (c) in FIG. 4 are the results under the conditions β=0.8, β=1, and β=1.2, respectively. Although the multi-view 3D display system in accordance with a one-dimensional PB design (a vertical PB) and a two-dimensional PB design (a tilted PB) are different in terms of the viewing zone characteristics according to β, there are common characteristics in that the crosstalk ($CT_{av}$) is decreased as β decreases and the maximum brightness ($I_{nv}$) of the viewing zone at a predetermined value or more is generated as β increases.

In conclusion, in the vertical PB or tilted PB design, when β is designed to be greater than 1, the brightness of the viewing zone is the same, but a tendency of the crosstalk between adjacent viewpoints to increase is shown. When β decreases below 1, the crosstalk may ideally be zero and a uniform region of the viewing zone is also increased.

However, the viewing zone characteristics of an HD-MV3D display apparatus in which a PB is applied to a high-density display panel of equal to or greater than 250 pixels per inch (PPI) (e.g., an ultra-high density (UHD) display of 15.6 inches has a PPI of 282 and a subpixel width of the display of 30 μm) are different from the above computer simulation results in that the brightness of the viewing zone is significantly decreased and the crosstalk between adjacent viewpoints is largely increased. Therefore, the viewing zone characteristics of a case in which the high-density display panel is used for the conventional autostereoscopic 3D display apparatus have a problem which may not be optimized only by a geometric design.

PRIOR ART DOCUMENT

Patent Document (Patent Document 1) Korean Laid-Open Patent No. 10-2012-0034581

SUMMARY OF THE INVENTION

The present invention is directed to providing a multi-view 3D display apparatus which optimizes viewing zone characteristics in consideration of diffraction effects when a viewpoint distance is equal to or smaller than a pupil width.

The present invention is also directed to providing a multi-view 3D display apparatus which optimizes viewing zone characteristics according to a relation between the viewing zone characteristics and a parameter which affects the viewing zone characteristics.

According to one aspect the present invention, a multi-view 3D display apparatus includes a display panel in which pixels (or subpixels) outputting an image are arranged and a parallax barrier disposed on a front surface of the display panel and including a plurality of apertures, wherein the apertures of the parallax barrier are set according to a Fresnel number calculated as in the following expression.

$$n_{FR} \cong \frac{1}{4}\frac{1}{\lambda \cdot L}\beta^2(W_p \cdot D_{vp}) \quad \text{[Expression]}$$

Here, $n_{FR}$ denotes a Fresnel number, λ denotes a central wavelength of visible light, L denotes an optimum viewing distance, β denotes a PB aperture ratio, $W_P$ denotes a horizontal width of a pixel in which a view image is arranged, and $D_{VP}$ denotes a distance between designed viewpoints.

Preferably, an image output from the display panel may be a high-density multi-view image in which a viewpoint distance is less than 10 mm.

Preferably, a horizontal width of the pixels (or subpixels) may be equal to or less than 60 μm.

Preferably, the following expression may be used to set an optimum Fresnel number in consideration of diffraction effects.

$$\gamma \equiv \frac{I_{nv}}{CT_{av}/100} \quad \text{[Expression]}$$

γ as defined above refers to a brightness value of a viewing zone compared to an amount of crosstalk.

Here, the Fresnel number at which γ becomes maximum may preferably be in a range of 0.4 to 0.7, and the Fresnel number at which γ becomes maximum is more preferably 0.5.

Preferably, the PB aperture may be formed in a direction perpendicular to the display panel.

BRIEF DESCRIPTION OF THE DRAWINGS

The patent or application file contains a least one drawing executed in color. Copies of this patent or patent application publication with color drawing(s) will be provided by the Office upon request and payment of the necessary fee. The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the advantages and characteristics of the present invention and the methods of accomplishing the same may be clearly understood by reference to the detailed description of exemplary embodiments to be described and the accompanying drawings. However, the present invention is not limited to the exemplary embodiments disclosed below, and may be implemented in many different forms. These exemplary embodiments are merely provided to complete the disclosure of the present invention and fully convey the scope of the present invention to those of ordinary skill in the art, and the present invention should be defined only by the accompanying claims. Throughout the specification, like numerals denote like elements. As used herein, the term "and/or" includes any and all combinations of one or more of the associated listed items.

While such terms as "first," "second," etc., may be used to describe various elements, components and/or sections, these elements, components and/or sections must not be limited to the above terms. The above terms are used only to distinguish one element, component or section from another element, component or section. Therefore, it will be understood that, although the terms "a first element," "a first component," or "a first section" may be used hereinafter, the terms could be "a second element," "a second component," or "a second section," respectively, within the technological scope of the present invention.

In addition, the symbols (e.g., a, b, c, etc.) of each step are used for convenience of explanation and not for the purposes of explanation of each step. Unless the context clearly indicates specific orders, steps may be performed differently from the stated orders. That is, steps may be performed in the same manner as the stated order or performed substantially at the same time or performed in an order opposite to the stated order.

The terms used herein are provided only to describe embodiments of the present invention and not for purposes of limitation. Unless the context clearly indicates otherwise, the singular forms include the plural forms. It will be understood that the terms "comprise" or "comprising," when used herein, specify some stated components, steps, operations and/or elements, but do not preclude the presence or addition of one or more other components, steps, operations and/or elements.

Unless otherwise defined, all terms (including technical and scientific terms) used herein have the same meaning as commonly understood by one of ordinary skill in the art to which the present invention belongs. Also, it will be further understood that terms, such as those defined in commonly used dictionaries, will not be interpreted in an idealized or overly formal sense unless expressly so defined herein.

Further, in the description of the present invention, when it is determined that detailed descriptions of related well-known functions or configurations unnecessarily obscure the gist of the present invention, such detailed descriptions will be omitted. Terms described below are defined in consideration of functions in the present invention and meanings may vary depending on a user's or operator's intentions or customs. Therefore, the meanings of terms should be interpreted based on the scope throughout this specification.

Figure 5:
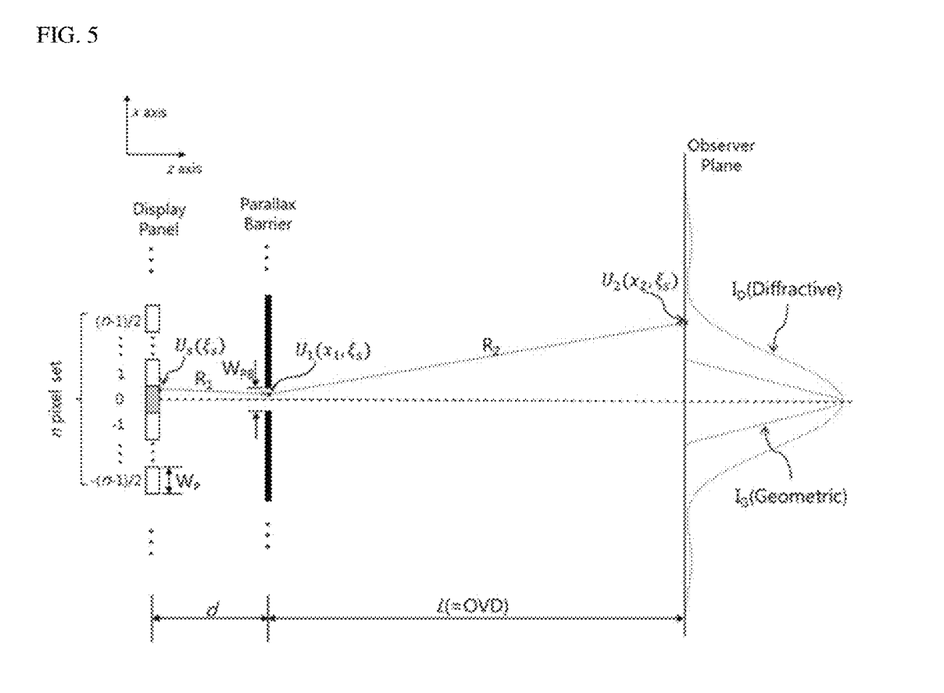
FIG. 5 is a view of one-dimensional modeling of a high-density multi-view 3D (HD-MV3D) display apparatus in which diffraction effects are applied according to one embodiment of the present invention.

FIG. 5 is a view with respect to one-dimensional modeling of a high-density multi-view 3D (HD-MV3D) display apparatus in which diffraction effects are applied according to one embodiment of the present invention and illustrates a simplified one-dimensional structure of HD-MV3D display for computer simulating diffraction effects.

Referring to FIG. 5, the HD-MV3D display apparatus may include a display panel on which pixels are arranged for outputting an image and a parallax barrier (PB) having an aperture at a front surface of the display panel.

In general, a multi-view 3D (MV3D) display apparatus is designed to form a common viewing zone of n viewpoints at a designed optimum viewing distance (OVD). In the common viewing zone, n pixel sets on which view images are arranged are paired with one of the apertures of the PB to form one unit 3D pixel. When display pixels, a viewpoint distance, and an optimum viewing distance are given, a viewing zone formed from the unit 3D pixels may have a PB aperture period and a distance d between display pixels and the PB as designed in the following Expression 5 such that a viewing zone of the same view is formed at the same horizontal (x-axis direction) position at a geometric OVD.

$$d = \frac{w_p \cdot L}{D_{vp}} \quad \text{[Expression 5]}$$

Here, L is an OVD of the MV3D display, $W_P$ is a pixel width, and $D_{VP}$ is a viewpoint distance.

In the MV3D display in consideration of only geometric optics, a PB aperture $W_{PBS}$ is generally designed to be approximately the same as the pixel width as shown in Expression 1. In FIG. 5, $I_G$ is brightness of a viewing zone formed at a position of an observer and is a case only considering geometric optics as illustrated in FIG. 2.

However, in the HD-MV3D display on which diffraction effects largely act, when the pixel width $W_P$ or the viewpoint distance $D_{VP}$ is changed, the size of the PB aperture which realizes optimum optical viewing zone characteristics is changed. In FIG. 5, $I_D$ denotes brightness of a viewing zone formed at a position of an observer in the HD-MV3D display in consideration of diffraction effects.

Figure 6:
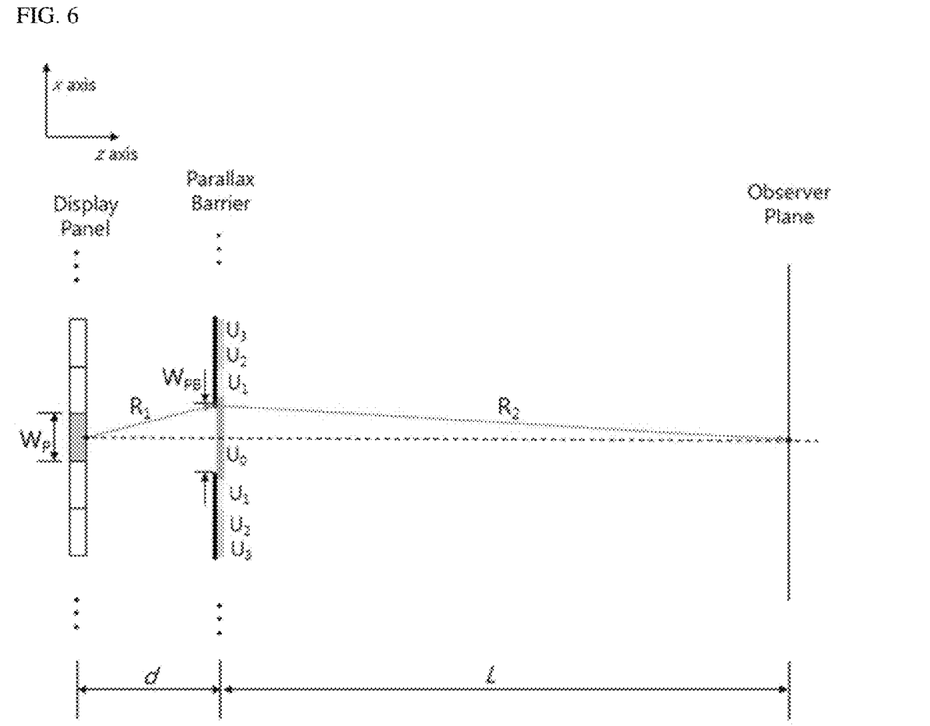
FIG. 6 is a view illustrating a Fresnel number according to one embodiment of the present invention.

FIG. 6 is a view for illustrating a Fresnel number of the HD-MV3D display apparatus in consideration of diffraction effects.

The Fresnel number $n_{FR}$ may be introduced as a primary design parameter related to optical characteristics of the MV3D or HD-MV3D display design in which the diffraction effects are considered.

As shown in FIG. 6, in optics, a case in which a PB with an aperture is placed between a light source of a display panel at one side and an observation point at the other side which is on a line perpendicular to the PB surface from the source is assumed. Here, $\lambda/2$ which is a difference between optical paths R1 and R2 of light generated from the light source passing the observation point on the opposite side after passing an arbitrary position on the PB and an optical path (dotted line) passing the shortest distance may be an integer multiple difference. An arbitrary position on the PB forms a concentric circle around the PB position at which the shortest dotted line connecting the light source to the observation point perpendicularly meets the PB. A region which is distinguished by the concentric circle is a Fresnel zone, and an integer value of $\lambda/2$ which distinguishes the Fresnel zone is a Fresnel number (here, $\lambda$ is a wavelength).

Referring to FIG. 6, for example, when an optical path difference is $\lambda/2$, $n_{FR}$ is equal to 1. The inside of the boundary becomes $U_0$. When the optical path difference is $3*(\lambda/2)$, $n_{FR}$ is equal to 3, and the inside of the boundary becomes Fresnel zone $U_2$.

When the Fresnel number is applied to the MV3D display apparatus of FIG. 6, the following Expression 6 is obtained.

$$(R_1 + R_2)_{max} = \sqrt{d^2 + \left(\frac{W_{PB}}{2}\right)^2} + \sqrt{L^2 + \left(\frac{W_{PB}}{2}\right)^2} \quad \text{[Expression 6]}$$

Here, d is a distance between a display pixel and the PB, and L is an OVD between the PB and an observation plane. $W_{PB}$ is a width of the PB aperture, and here, $W_{PB}$ is used as any independent parameter differing from the geometric design. In a general HD-MV3D or MV3D design, since $d \gg W_{PB}$ and $L \gg W_{PB}$, Expression 6 may be approximated as the following Expression 7.

$$(R_1 + R_2)_{max} \simeq (d + L) + \frac{1}{2}\left(\frac{W_{PB}}{2}\right)^2 \left(\frac{1}{d} + \frac{1}{L}\right) \quad \text{[Expression 7]}$$

Here, the Fresnel number $n_{FR}$ of the MV3D display apparatus from Expression 7 may be expressed as the following Expression 8.

$$\frac{\lambda}{2} n_{FR} = (R_1 + R_2)_{max} - (d + L) = \frac{1}{2}\left(\frac{W_{PB}}{2}\right)^2 \left(\frac{1}{d} + \frac{1}{L}\right) \quad \text{[Expression 8]}$$

When this is simplified, the following Expression 9 is obtained.

$$n_{FR} = \frac{1}{\lambda}\left(\frac{W_{PB}}{2}\right)^2 \left(\frac{1}{d} + \frac{1}{L}\right) = \left(\frac{W_{PB}}{2}\right)^2 \left(\frac{d+L}{\lambda \cdot d \cdot L}\right) \quad \text{[Expression 9]}$$

When d in Expression 5 is substituted into Expression 9 and the expression is simplified, the following Expression 10 is obtained.

$$n_{FR} = \frac{1}{\lambda \cdot L}\left(\frac{W_{PB}}{2}\right)^2 \left(1 + \frac{D_{vp}}{W_p}\right) \simeq \frac{1}{\lambda \cdot L}\left(\frac{W_{PB}}{2}\right)^2 \frac{D_{vp}}{W_p} \quad \text{[Expression 10]}$$

Here, $D_{VP} \gg W_P$, which is satisfied under a general HD-MV3D condition, is applied to the last approximation.

Lastly, when Expression 10 is simplified using the PB aperture ratio β which was introduced in Expression 4, the following Expression 11 is obtained.

$$n_{FR} \simeq \frac{1}{4}\frac{1}{\lambda \cdot L}\beta^2 (W_p \cdot D_{vp}) \quad \text{[Expression 11]}$$

The expression of the Fresnel number is an important key factor in the present invention. This is because, when $n_{FR}$ is a parameter which defines optical characteristics of the system in the HD-MV3D design, the PB aperture ratio β has to be changed in order to maintain the same $n_{FR}$ when the pixel width $W_P$ or the viewpoint distance $D_{VP}$ of the HD-MV3D system is changed as shown in Expression 11. For example, when the pixel width $W_P$ is reduced by ½ and the viewpoint distance $D_{VP}$ is reduced by ½, the PB aperture β has to be doubled to implement the same $n_{FR}$.

That is, when diffraction effects are applied, a geometric design parameter is applied in the same manner while following a principle of forming a geometric viewing zone, however, the shape of a viewing zone that is formed is different from predictions based on geometric considerations as shown in FIG. 5. In particular, in the case of the HD-MV3D display apparatus to which a high-resolution panel and a viewpoint distance smaller than a pupil width of an observer are applied, a PB aperture based on geometric considerations is in a region in which problems of large crosstalk and a decrease in brightness of a viewing zone occur. A method of generalizing an appropriate PB aperture in the HD-MV3D display which is not predictable in such geometric considerations by connecting with the Fresnel number will be described with reference to FIGS. 7 to 12.

Figure 7:
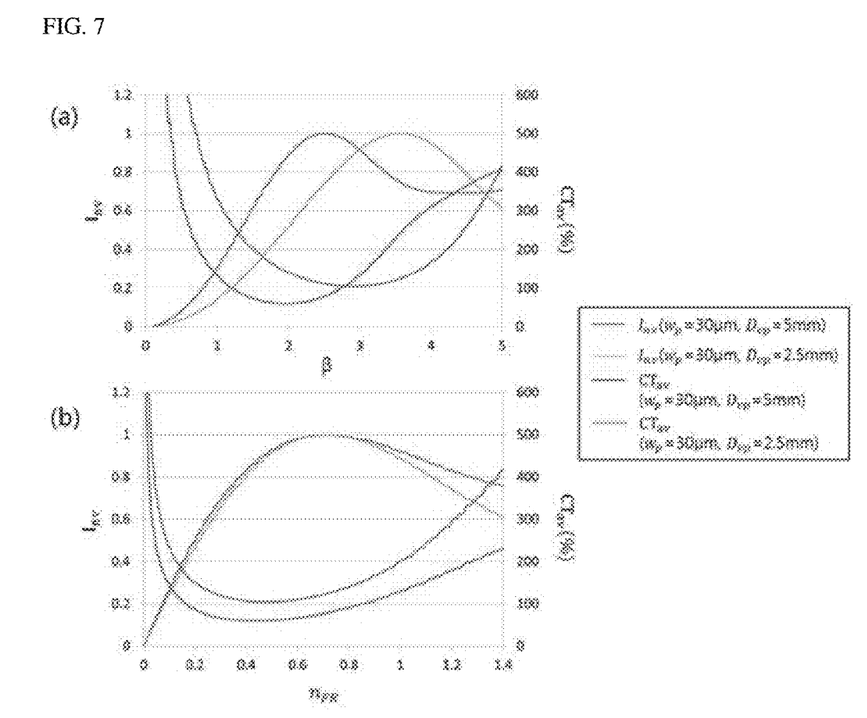
FIG. 7 is a view illustrating computer simulation results according to a distance between designed viewpoints of a PB-based HD-MV3D display apparatus in which diffraction effects are applied according to one embodiment of the present invention.

FIG. 7 is a view illustrating computer simulation results according to a distance between designed viewpoints of a PB-based HD-MV3D display apparatus in which diffraction effects are applied according to one embodiment of the present invention.

FIG. 7 illustrates changes in $I_{nv}$ and $CT_{av}$ which are optical characteristics of a viewing zone in the HD-MV3D display when the pixel width $W_P$ or the viewpoint distance $D_{VP}$ of the display panel is changed. In FIG. 7, parameters of changes in viewing zone characteristics are the PB aperture ratio $\beta$ and the Fresnel number related to the PB aperture ratio when geometric design conditions are determined. Further, the results of FIG. 7 were obtained from the settings in which the pixel width (here, since the viewpoints are arranged in a subpixel unit, it is actually a subpixel width) of the display panel used for the design was 30 µm, the OVD was 600 mm, and the viewpoint distances were 2.5 mm and 5 mm which are smaller than the average pupil size.

Referring to (a) in FIG. 7, brightness of a viewing zone increases up to a predetermined range of $\beta$ in accordance with $\beta$, and rather decreases above the predetermined range. This is much different from FIG. 3 which is the case in which only geometric computer simulation was considered. In addition, $\beta$ at which the maximum brightness of the viewing zone is realized is equal to 3.57 when the viewpoint distance is 2.5 mm, and decreases to 2.51 when the viewpoint distance is 5 mm. On the other hand, brightness of a viewing zone of HD-MV3D display having two types of viewpoint distances according to the Fresnel number $n_{FR}$ instead of an aperture width parameter $\beta$ shows the maximum brightness of the viewing zone at a predetermined position of $n_{FR}$ of about 0.7 as shown in (b) of FIG. 7.

In addition, upon comparison of crosstalk between adjacent viewpoints, the cases of two different conditions of the viewpoint distance both show the minimum $CT_{av}$ at predetermined values of $\beta$ ($\beta$=2.92 when the viewpoint distance is 2.5 mm, and $\beta$=1.98 when the viewpoint distance is 5.0 mm), which are different from FIG. 3 with only geometric effects considered. This is different from the geometric characteristic showing a monotonic decrease as $\beta$ decreases, and is also different from the one-dimensional HD-MV3D design in that $\beta$ at which the maximum brightness of the viewing zone is realized and $\beta$ at which the minimum brightness of the viewing zone is realized are different. The crosstalk $CT_{av}$ between adjacent viewpoints is also expressed in a more cohesive manner as shown in (b) of FIG. 7 even when the viewpoint distance is different while expressing $n_{FR}$ as a parameter instead of $\beta$. However, even with the same pixel widths, as the viewpoint distance decreases, the $n_{FR}$ value at which $CT_{av}$ becomes the minimum value increases from 0.443 when the viewpoint distance is 5 mm to 0.479 when the viewpoint distance is 2.5 mm, and the minimum $CT_{av}$ value itself increases.

Figure 8:
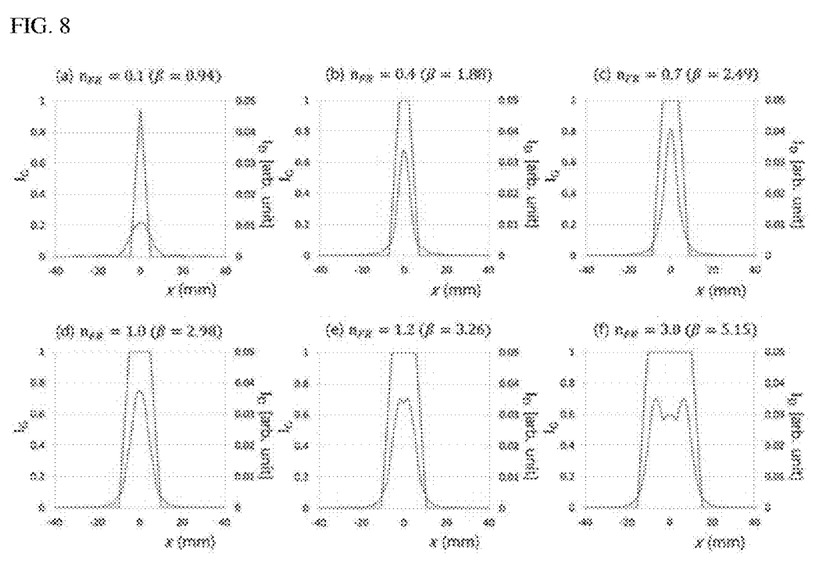
FIG. 8 is a view illustrating computer simulation results with respect to a viewing zone distribution in accordance with a Fresnel number (or $\beta$) of a PB-based HD-MV3D display apparatus in which diffraction effects are applied according to one embodiment of the present invention.

FIG. 8 is a view illustrating computer simulation results with respect to a viewing zone distribution in accordance with a Fresnel number (or a PB aperture $\beta$) of a PB-based HD-MV3D display apparatus in which diffraction effects are applied according to one embodiment of the present invention and illustrates characteristics of a unit viewing zone in accordance with $n_{FR}$ when the viewpoint distance is 5 mm in the HD-MV3D design of FIG. 7. This is to examine optical characteristics according to $n_{FR}$ in the HD-MV3D design in consideration of diffraction effects in more detail.

Referring to FIG. 8, $I_G$ is a viewing zone distribution (red) in accordance with a horizontal direction (x-axis direction) on an observation plane when diffraction effects are considered, and $I_D$ is a viewing zone distribution (blue) when the diffraction effects are considered. A section near $n_{FR}$ of about 0.1 is a section in which Fraunhofer diffraction effects are great, where a full width at half maximum (FWHM) of a viewing zone is widened in comparison of geometric formation of a viewing zone, and the brightness of the viewing zone is smaller than that of the maximum value at about 30%. In this section, because the FWHM of the viewing zone increases as $n_{FR}$ decreases, the crosstalk $CT_{av}$ between adjacent viewpoints rapidly increases. Such Fraunhofer diffraction characteristics decrease as $n_{FR}$ increases, and therefore, the FWHM of the viewing zone becomes the minimum value when $n_{FR}$ is about 0.45 ((b) in FIG. 8).

The $n_{FR}$ between 0.45 and 0.7 is a section in which the brightness of the viewing zone and the FWHM of the viewing zone both increase. The $n_{FR}$ between 0.7 and 1.2 is a section in which the brightness of the viewing zone decreases and the FWHM of the viewing zone continuously increases, and the $n_{FR}$ greater than 1.2 is a section in which the brightness of the viewing zone has a constant value while the FWHM of the viewing zone continuously increases.

Figure 9:
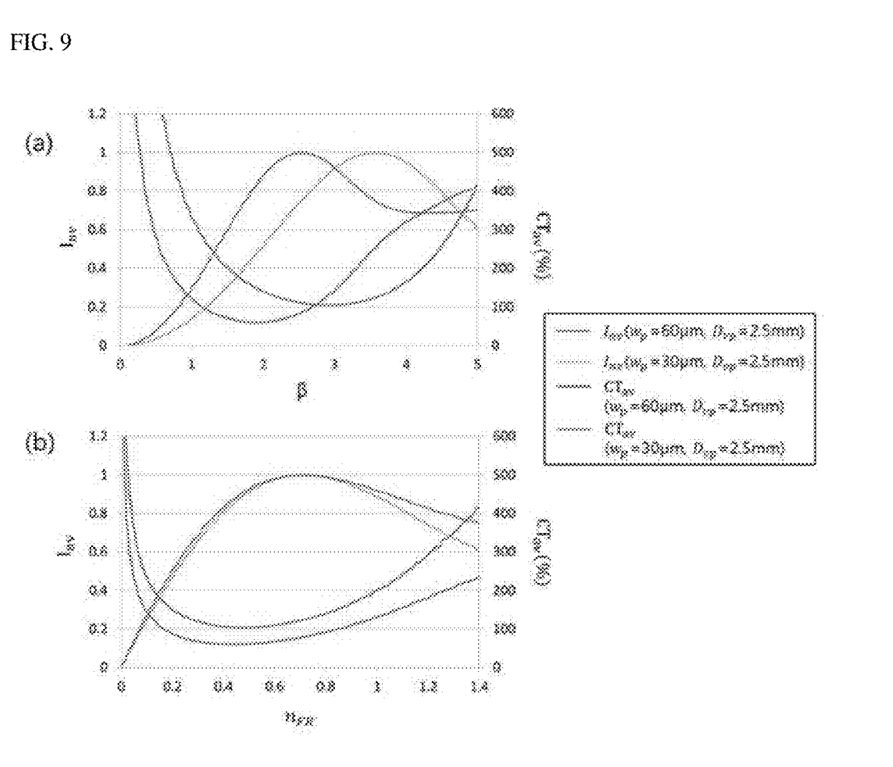
FIG. 9 is a view illustrating computer simulation results according to a horizontal width of a pixel, on which a view image is disposed, of a PB-based HD-MV3D display apparatus in which diffraction effects are applied according to one embodiment of the present invention.

FIG. 9 is a view illustrating computer simulation results according to a horizontal width of a pixel, on which a view image is disposed, of a PB-based HD-MV3D display in which diffraction effects are applied according to one embodiment of the present invention, and illustrates characteristics of brightness of a viewing zone and $CT_{av}$ according to $\beta$ and $n_{FR}$ in cases in which the pixel width of a display panel in the design of the HD-MV3D system having the same viewpoint distance $D_{VP}$ of 2.5 mm are 30 µm and 60 µm.

Referring to (a) in FIG. 9, it can be confirmed that, even with the same viewpoint distance, when the pixel width of the display changes, a value of $\beta$ at which the brightness of the viewing zone becomes the maximum or $CT_{av}$ becomes the minimum will be different. Even in this case, when the characteristics of the viewing zone in accordance with $n_{FR}$ are examined as shown in (b) of FIG. 9, although the HD-MV3D viewing zones are of different pixel widths, the maximum brightness of the viewing zones is realized when $n_{FR}$ is approximately 0.7, and the minimum $CT_{av}$ is realized when $n_{FR}$ is approximately 0.45.

Therefore, the HD-MV3D display apparatus in which diffraction effects have to be applied cannot show the optimum characteristics of the viewing zone when the PB aperture width is set to the nearly same value as the pixel width (i.e., $W_{PB} \cong W_P$ or $\beta$=1) in consideration of only conventional geometric relations. However, as described above, the HD-MV3D display in which diffraction effects are considered may be optimally designed in terms of brightness of a viewing zone or crosstalk as a value of $\beta$ changes. In particular, although it is hard to predict an optimum position of the viewing zone when the used pixels (or subpixels) are changed or the viewpoint distance is changed, it can be confirmed that the optimization of constant characteristics of the viewing zone is possible even when $W_P$ and $D_{VP}$ of various conditions are applied by comparing optical characteristics of the viewing zone after $\beta$ is converted into the Fresnel number $n_{FR}$ corresponding to each PB aperture when the diffraction effects are considered.

It can be confirmed through FIGS. 7 and 8 that $n_{FR}$ realizing the maximum brightness of the viewing zone and $n_{FR}$ realizing the minimum $CT_{av}$ of the viewing zone are different in the characteristics of the viewing zone of the HD-MV3D display apparatus in consideration of diffraction effects under the one-dimensional structure, and the minimum $CT_{av}$ value is different for each HD-MV3D display. Therefore, a new parameter which expresses system performance that may set the optimum $n_{FR}$ of the HD-MV3D display apparatus in consideration of diffraction effects is required. Hereinafter, a new parameter γ that evaluates performance of the HD-MV3D display apparatus and the optimization of the HD-MV3D display apparatus through the parameter γ will be described in detail.

Figure 10:
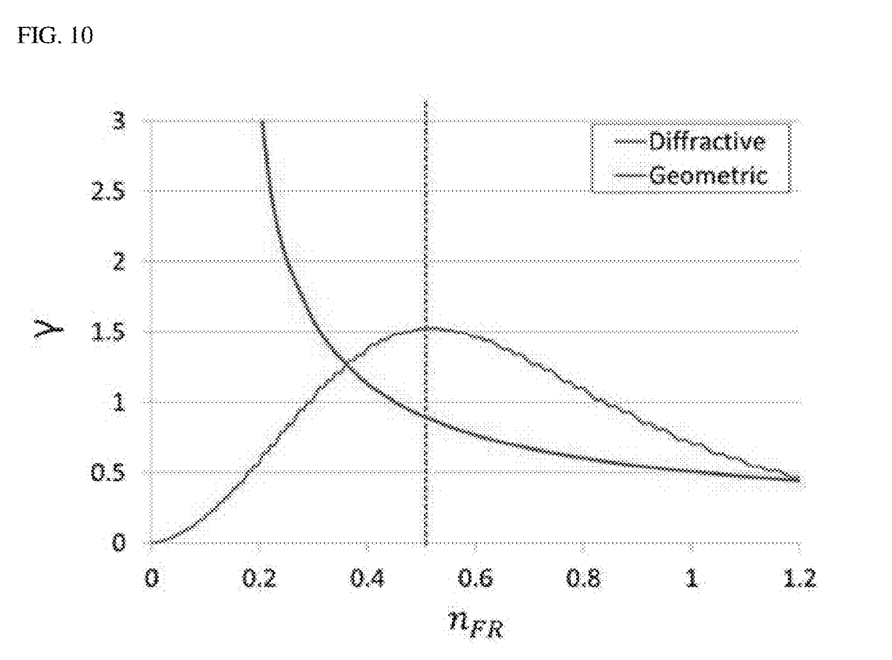
FIG. 10 is a view illustrating performance evaluation criteria in consideration of brightness and crosstalk of a viewing zone according to one embodiment of the present invention.

FIG. 10 is a graph illustrating performance evaluation criteria in consideration of brightness of a viewing zone and crosstalk according to one embodiment of the present invention, and the performance evaluation criteria correspond to the parameter γ.

As described in FIGS. 7 to 9, since a region in which the Fresnel number $n_{FR}$ is as small as approximately 0.1 is a Fraunhofer approximation region, when diffraction effects are considered, the crosstalk becomes minimum at a predetermined range of the Fresnel number, for example, in a range of $0.4 < n_{FR} < 0.5$, which is different from the geometric cases in which the crosstalk decreases as the PB aperture decreases (i.e., as β decreases). In addition, there is a Fresnel number $n_{FR}$ of about 0.7 at which the brightness of the viewing zone becomes the maximum. Since the brightness of the viewing zone and the crosstalk are both important optimization values in the HD-MV3D display apparatus, the parameter γ is defined as follows in consideration of both characteristics of viewing zones.

$$\gamma \equiv \frac{I_{nv}}{CT_{av}/100} \qquad \text{[Expression 12]}$$

γ as defined above denotes a brightness value of a viewing zone compared to an amount of crosstalk, and a case in which γ becomes the maximum value may be an optimum design in consideration of the amount of crosstalk and the brightness of the viewing zone.

FIG. 10 shows characteristics of γ as defined in Expression 12 in accordance with $n_{FR}$ in the case in which only geometric optics are considered and the case in which diffraction effects are considered in an HD-MV3D display design. In the characteristics when only geometric optics are considered, γ rapidly increases as $n_{FR}$ decreases. This is because, when only the geometric optics are considered, $CT_{av}$ converges on zero as $n_{FR}$ decreases to be equal to or less than a predetermined value, and γ diverges to infinity. However, when diffraction effects are actually applied, γ has the maximum value at a value between $n_{FR}$ having the minimum $CT_{av}$ and $n_{FR}$ forming the maximum brightness of viewing zone. That is, under the condition of the HD-MV3D of FIG. 10, when $n_{FR}$ is in a range of 0.4 and 0.7, and more preferably, when $n_{FR}$ is 0.5, γ becomes the maximum.

Through such a newly introduced γ, the Fresnel number which optimizes characteristics of the HD-MV3D display may be determined. A value of γ is related to quality of characteristics of a viewing zone. Specifically, in the HD-MV3D design, when $W_P$ decreases or a viewpoint distance $D_{VP}$ decreases, the minimum realizable value of $CT_{av}$ increases, and thereby γ may decrease.

A method of generalizing a suitable PB aperture in connection with the Fresnel number in the HD-MV3D display design which is not predictable in terms of geometric considerations was previously described, and hereinafter, a determination of whether such approach is experimentally reasonable will be verified with reference to FIGS. 11 and 12.

Figure 11:
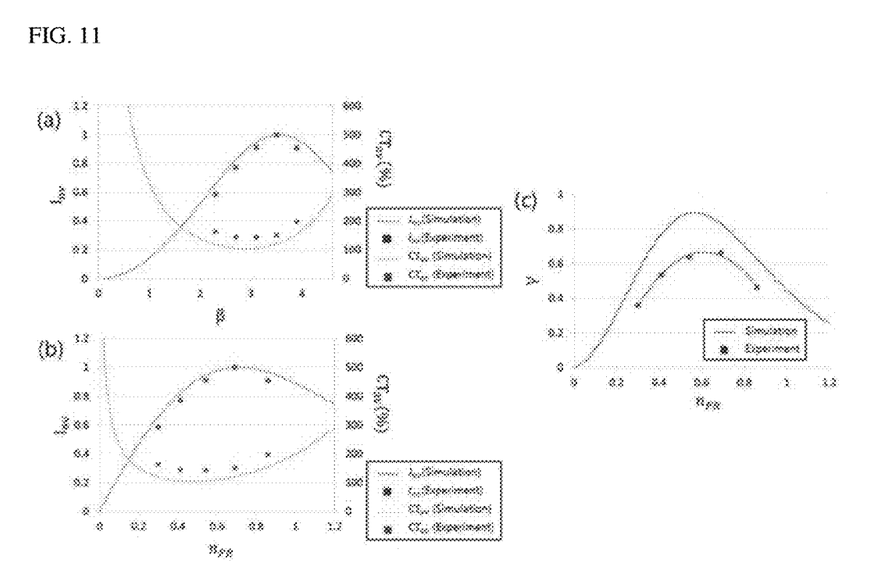
FIG. 11 is a view comparing optical characteristics between a computer simulation and an experiment of an HD-MV3D display design.

FIG. 11 is a view comparing optical characteristics between a computer simulation and an experiment of an HD-MV3D display design.

FIG. 11 is a comparison result of optical characteristics in the HD-MV3D display apparatus having the following conditions. The display panel was a UHD-level commercial laptop of 15.6 inches, the subpixel width was 30 μm, the OVD was 600 mm, and there were two types of viewpoint distances: 2.51 mm and 5.06 mm Five types of conditions of the PB aperture ratio β were chosen for each viewpoint distance, the size of a PB design pattern for each condition was (H) 60 mm×(V) 85 mm, and the number of designed viewpoints was 13. FIG. 11 is a result comparing characteristics of each of white, red (R), green (G), and blue (B) viewing zones under a vertical PB structure.

β which was set as an experimental condition was determined by dividing a range approximately from 0.25 to 0.85 based on the Fresnel number $n_{FR}$, and the number of subpixels involved in forming viewing zones for each viewpoint at a measurement position was about 48,000 in the case of viewing zones for each color, and about 145,000 in the case of the white viewing zone.

Referring to FIG. 11, a difference between a computer simulation result and an experimental result can be confirmed with respect to a green wavelength, and tendencies of a brightness of a viewing zone and an amount of crosstalk under the computer simulation conditions correspond to the experimental results when $D_{VP}$=2.51 mm which is the HD-MV3D condition with five different values of $n_{FR}$. In particular, the experimental results of characteristics of the value of γ in which the brightness of the viewing zone and the amount of crosstalk are simultaneously considered according to $n_{FR}$ mostly correspond to the computer simulation results.

However, although an absolute value of the amount of crosstalk which is predicted by the computer simulation is in a range of approximately 101% to 150% in an experimental condition range, the absolute value is in a range of 143% to 196%, showing a general increase in terms of the experimental results. The difference makes the absolute value of γ smaller than that of the computer simulation results as shown in FIG. 11. To examine the reason for this difference, the computer simulation results and the experimental results with respect to shapes of unit viewing zones are compared as shown in FIG. 12.

Figure 12:
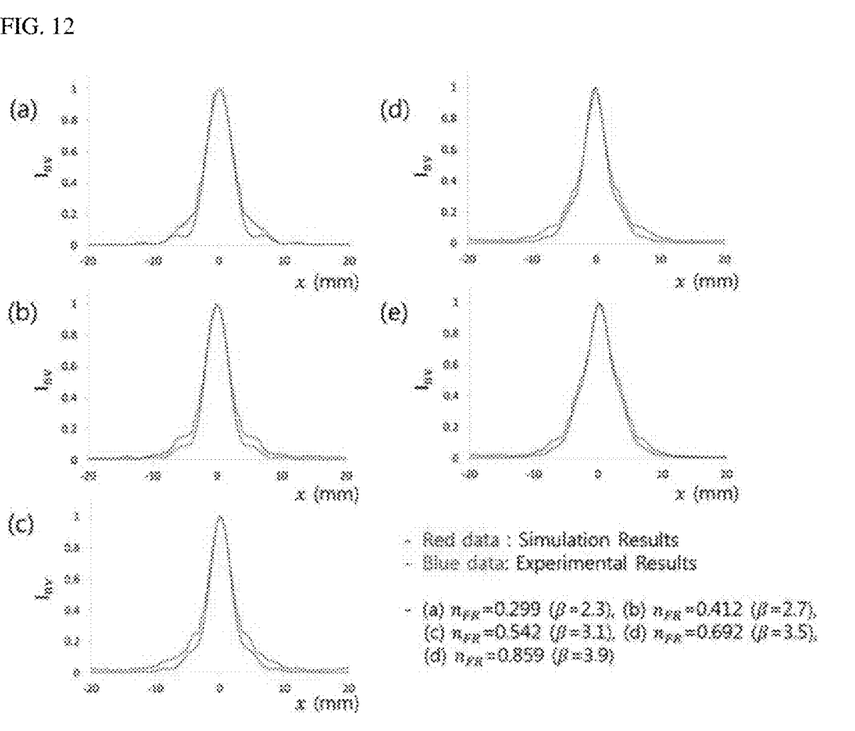
FIG. 12 is a view comparing results between a computer simulation and an experiment about a shape of a unit viewing zone of an HD-MV3D display design.

Referring to FIG. 12, viewing zone distributions in terms of computer simulation results for each $n_{FR}$ condition may be compared to the experimental results. Two results have an almost similar FWHM of viewing zones, but tail portions of viewing zones are increased in the experimental distribution of viewing zones more than in the computer simulation results, and since the portions are applied, the amount of crosstalk of the experimental results can be seen to have increased compared to the computer simulation results under the same conditions. Further, unlike the computer simulation results, shapes of viewing zones can be seen to be partially deformed in the experimental results. This is because, although only one PB aperture was considered in the computer simulation results and diffraction effects caused by adjacent PB apertures disposed in a predetermined period were excluded, the characteristics of viewing zones were formed at observing positions through the PB aperture from approximately 48,000 pixels with respect to green in the actual experiment.

Further, while the computer simulation results were modeled with no medium between pixels and the PB aperture, in reality, there is a medium having a predetermined refractive index between the pixels and the PB aperture, and thus a result which is worse than ideal characteristics of a viewing zone formed by one PB aperture at an observing position can be considered to be shown.

Under the same HD-MV3D design conditions as above, it was confirmed that experimental results using a tilted PB in which the tilted angle is arcTan(⅓) show the same characteristics as when the PB tilted angle is 0°, but the amount of crosstalk relatively increases with respect to the same $n_{FR}$. This is due to a further increase in the FWHM of a viewing zone being formed when the tilted PB is used compared to use of the vertical PB under the same conditions. The reason for the increase in FWHM of the viewing zone may be interpreted to be that the amount of crosstalk is further increased when the tilted PB is used compared to when the vertical PB is used at the same $n_{FR}$ even when only geometric optics are considered.

In addition, when considering γ defined by crosstalk, brightness of a viewing zone, or the brightness of the viewing zone with respect to the crosstalk, $n_{FR}$ which optimizes the characteristics of a viewing zone of the HD-MV3D system may be in a range of 0.4 to 0.7. Here, in accordance with the HD-MV3D system design, the maximum value of γ is changed, which means that the crosstalk between viewing zones decreases as the maximum value of γ is greater.

The example above is a result which was induced with respect to the PB arranged on a front surface of a display panel, however, this is applicable to a PB arranged on a rear surface of the display panel or an autostereoscopic 3D display using a line light source. Here, in the case of the Fresnel number $n_{FR}$, since the pixel width $W_P$ in the above example may be substituted into an aperture width of the PB arranged on the rear surface of the display panel or the line light source width, and a ratio between the pixel width of the display panel and the aperture width of the PB arranged on the front surface of the display panel may be substituted into a ratio between the aperture with of the PB arranged on the rear surface of the display panel or the line light source width and the pixel width of the display panel, the Fresnel number $n_{FR}$ of the HD-MV3D display apparatus may be similarly defined.

In accordance with the above description of the present invention, it is effective to optimize viewing characteristics of a PB-based HD-MV3D display on which diffraction effects largely act using a simple parameter.

Although the exemplary embodiments with respect to the HD-MV3D display apparatus according to the aforementioned present invention were described, the present invention is not limited thereto, and may be implemented in many different forms without departing from the scope of the accompanying claims, detailed descriptions, and accompanying drawings. All differences within the scope will be construed as being included in the present invention.

What is claimed is:

1. A multi-view 3D display apparatus comprising:
a display panel in which pixels (or subpixels) outputting an image are arranged; and
a parallax barrier disposed on a front surface of the display panel and including a plurality of apertures,
wherein the apertures of the parallax barrier are set according to a Fresnel number calculated by the following expression, $$n_{FR} \cong \frac{1}{4}\frac{1}{\lambda L}\beta^2(W_p \cdot D_{vp})$$ [Expression]

where, $n_{FR}$ denotes a Fresnel number, λ denotes a central wavelength of visible light, L denotes an optimum viewing distance, β denotes a parallax barrier aperture ratio, $W_P$ denotes a horizontal width of a pixel in which a view image is arranged, and $D_{VP}$ denotes a distance between designed viewpoints.

2. The multi-view 3D display apparatus of claim 1, wherein the image output from the display panel is a high-density multi-view image in which a viewpoint distance is less than 10 mm.

3. The multi-view 3D display apparatus of claim 1, wherein the pixels (or subpixels) have a horizontal width which is equal to or less than 60 μm.

4. The multi-view 3D display apparatus of claim 1, wherein the following expression is used to set an optimum Fresnel number in consideration of diffraction effects, $$\gamma \equiv \frac{I_{nv}}{CT_{av}/100}$$ [Expression]

where, γ as defined above refers to a brightness value of a viewing zone compared to an amount of crosstalk.

5. The multi-view 3D display apparatus of claim 4, wherein the Fresnel number at which γ becomes maximum is in a range of 0.4 to 0.7.

6. The multi-view 3D display apparatus of claim 5, wherein the Fresnel number at which γ becomes maximum is 0.5.

7. The multi-view 3D display apparatus of claim 1, wherein the parallax barrier aperture is formed in a direction perpendicular to the display panel.

* * * * *